United States Patent [19]
Kokeguchi et al.

[11] Patent Number: 5,350,191
[45] Date of Patent: Sep. 27, 1994

[54] LID OF AN AIR BAG DEVICE FOR A PASSENGER

[75] Inventors: Akira Kokeguchi; Takayasu Zushi, both of Shiga, Japan

[73] Assignee: Takata Corporation, Tokyo, Japan

[21] Appl. No.: 29,573

[22] Filed: Mar. 11, 1993

[30] Foreign Application Priority Data

Mar. 25, 1992 [JP] Japan .................. 4-067196

[51] Int. Cl.[5] ............................................. B60R 21/16
[52] U.S. Cl. ..................................................... 280/752
[58] Field of Search ........... 280/728 R, 728 A, 728 B, 280/732

[56] References Cited

U.S. PATENT DOCUMENTS

| | | | |
|---|---|---|---|
| 3,794,349 | 2/1974 | Fuller | 280/732 |
| 4,878,689 | 11/1989 | Mitzkus et al. | 280/728 B |
| 5,087,067 | 2/1992 | Seki et al. | 280/732 |
| 5,238,264 | 8/1993 | Barnes | 280/732 |

FOREIGN PATENT DOCUMENTS 0517414 12/1992 European Pat. Off. ........ 280/728 B

Primary Examiner—Margaret A. Focarino
Assistant Examiner—Paul N. Dickson
Attorney, Agent, or Firm—Kanesaka & Takeuchi

[57] ABSTRACT

A lid covers an opening of a container accommodating an air bag in a folded form. Upon development of the air bag, the lid pushed by the air bag is partially or fully rotated in a door-like form. The lid has a portion, which is located near a tip end of the lid during rotation and contacts a windshield of a vehicle. The lid is provided with a linear bendable portion, which enables rearward bend, in view of a rotating direction, of the portion near the tip end of the lid.

3 Claims, 5 Drawing Sheets

LID OF AN AIR BAG DEVICE FOR A PASSENGER

FIELD OF THE INVENTION

The present invention relates to an air bag device for a passenger which is provided in an instrument panel of a passenger's seat of an automobile for protecting the passenger upon collision of the vehicle, and in particular relates to an improvement of a lid of the same.

DESCRIPTION OF THE RELATED ART

FIG. 8 shows a schematic structure of an air bag device for a passenger. An instrument panel 10' is provided with an opening 14' for mounting an air bag device 12' for a passenger. A lid 16' of the air bag device 12' is disposed in the opening 14'. The air bag device 12' includes a container 18' having a front opening, which is covered with a plate of the lid 16', an air bag 20' which is accommodated in a folded form in the container 18', and an inflator 22' serving as a gas generator for developing the air bag 20. The lid 16' is provided at the rear surface of the plate with attachment pieces 24' and 26', which are attached to the container 18'. At 28' is indicated a windshield of the automobile.

Upon collision of the automobile, the inflator 22' operates to generate gas. Thereby, the air bag 20' starts to inflate. The inflating air bag 20' pushes the lid 16' to rotate and open the same around a position at or near the attachment piece 26' as indicated by alternate long and two short dashes in FIG. 8, and the air bag 20' largely develops into a cabin or interior space of the vehicle.

According to the lid 22' of the air bag device for the passage in the prior art described above, a range for rotation of the lid 22' is restricted due to contact of the tip end of the lid 22' with the windshield 28'.

OBJECT AND SUMMARY OF THE INVENTION

The present invention provides a lid of an air bag device for a passenger, wherein the lid covers an opening of a container accommodating an air bag in a folded form, and is adapted to be pushed by the air bag during development to partially or fully rotate and open in a door-like fashion, to wherein a portion of the lid, which forms a tip end portion and contacts a windshield of an automobile in a rotating operation, is bendable rearwardly in a direction of rotation of the lid.

According to the lid of the air bag device for the passenger according to the invention, the air bag develops to open the lid. In this operation, when the tip end of the lid contacts the windshield, the tip end portion bends in the rearward direction in view of the rotating direction. Therefore, the lid continues to rotate even after the contact, and thus opens to a large extent.

DETAILED DESCRIPTION OF THE PREFERRED EMBODIMENTS

Figure 1:
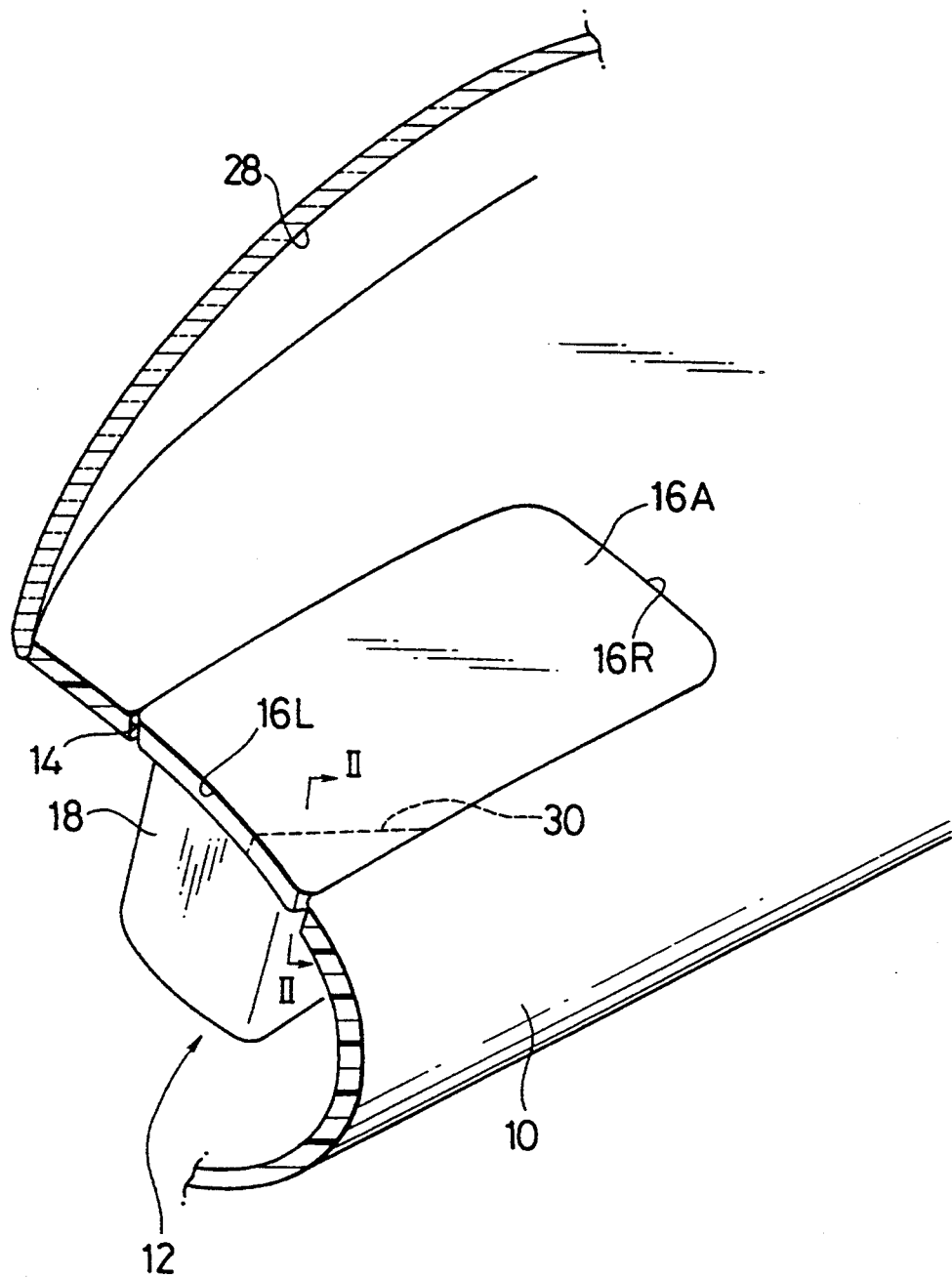
FIG. 1 is a perspective view showing an embodiment of the invention.
Figure 2:
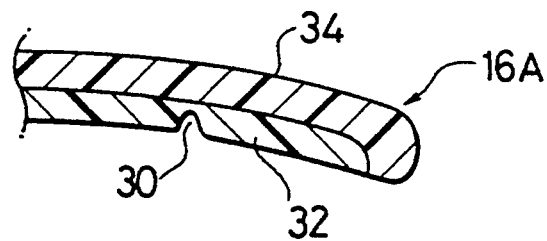
FIG. 2 is a cross section taken along line II—II in FIG. 1.
Figure 3:
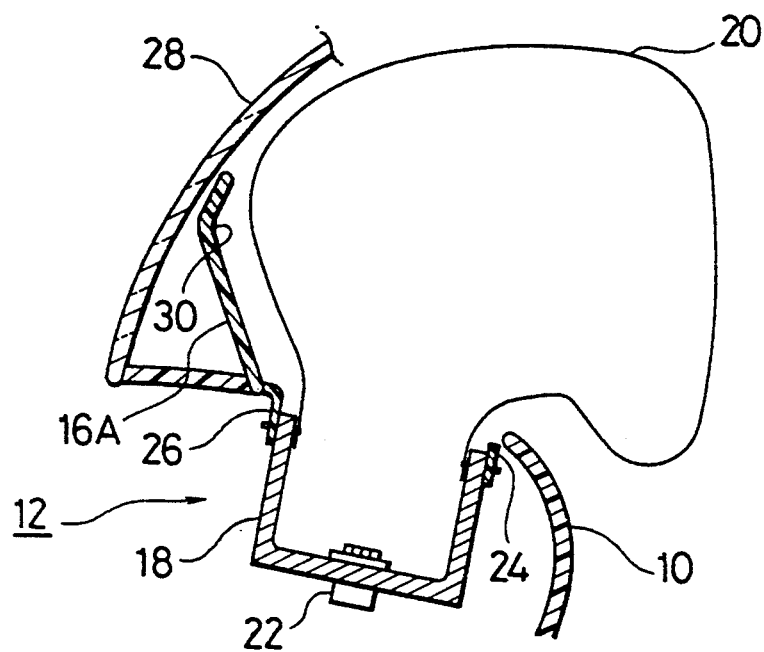
FIG. 3 is a cross section for showing an operation of the embodiment.

Embodiments of the invention will be described below with reference to the drawings. FIGS. 1, 2 and 3 show a lid of an air bag device for a passenger of a first embodiment of the invention. In this embodiment, a passenger seat is arranged at a left position in an automobile, in view of a running direction of an automobile, and a driver's seat is arranged at a right position. In front of the passenger's seat, there is arranged an instrument panel 10 in which an air bag device 12 for the passenger is provided.

In this embodiment, a lid 16A has a left side portion 16L, which is provided at a position near its tip end with a bendable portion 30. In this embodiment, the lid 16A is formed of an inner layer 32 made of hard synthetic resin and an outer layer 34 made of soft synthetic resin. The bendable portion 30 is formed of a groove provided in the inner layer 32.

Figure 8:
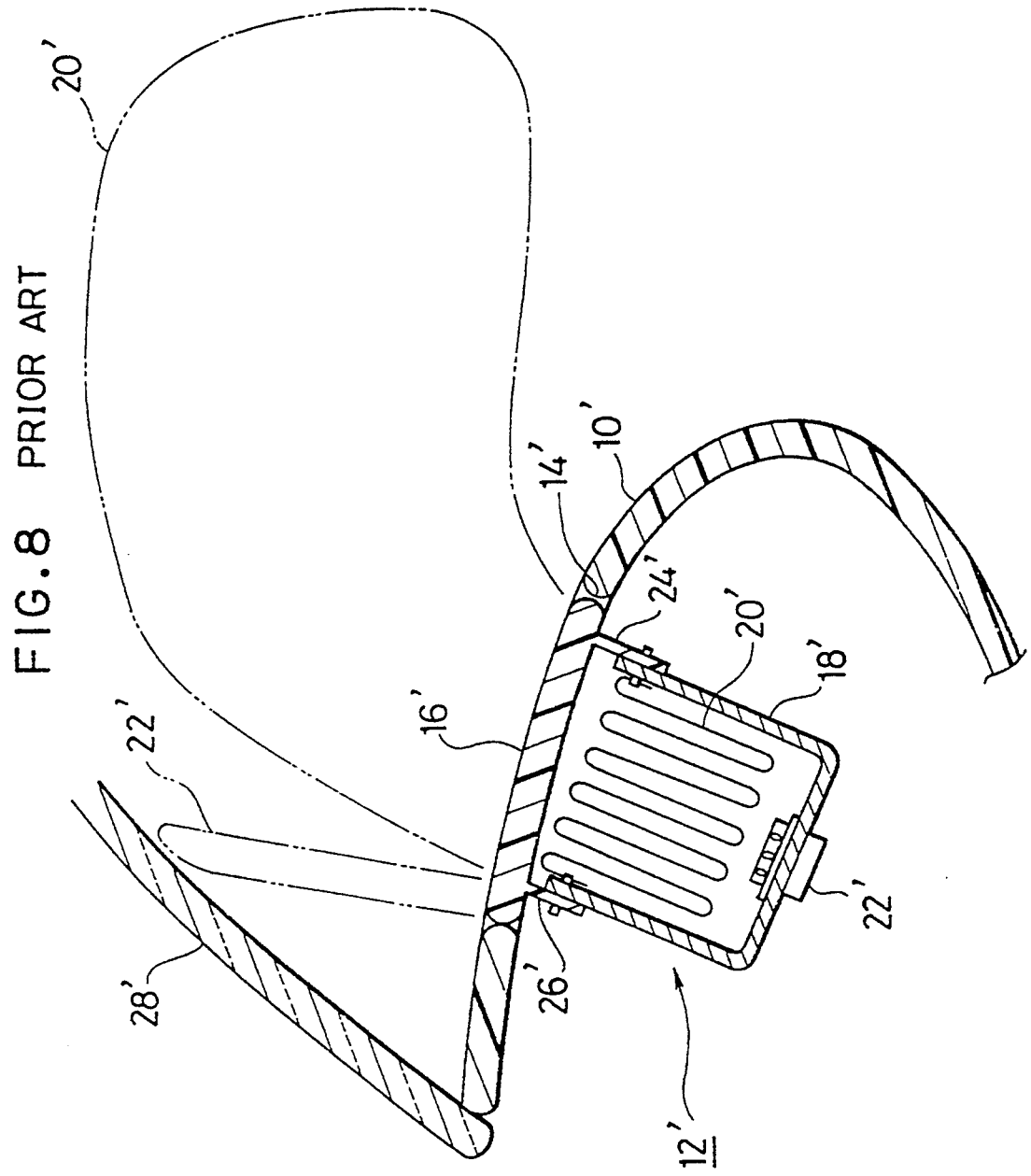
FIG. 8 schematically shows a structure of a lid of an air bag device for a passenger in the prior art.

Other portions and structures of the air bag device 12 for the passenger in FIG. 1 are the same as those in the foregoing prior art shown in FIG. 8, and thus bear numerals similar to those in FIG. 8 without primes.

In the air bag device 12 having the lid 16A thus constructed, when an inflator 22 is activated due to collision of the automobile, an air bag 20 pushes the rear side of the lid 16A to rotate and open it around a position of or near an attachment piece 26, as shown in FIG. 3. As shown also in FIG. 1, the left side 16L of the lid is nearer to a windshield 28 than a right side 16R. Therefore, the tip end portion of the left side 16L first contacts the windshield 28 when the lid 16A rotates in the opening direction. Thereby, the left end portion bends around the bendable portion 30, as shown in FIG. 3. Therefore, the lid 16A rotates to a larger extent, as compared with the prior art, and thus the air bag 20 quickly develops into the room.

Figure 4:
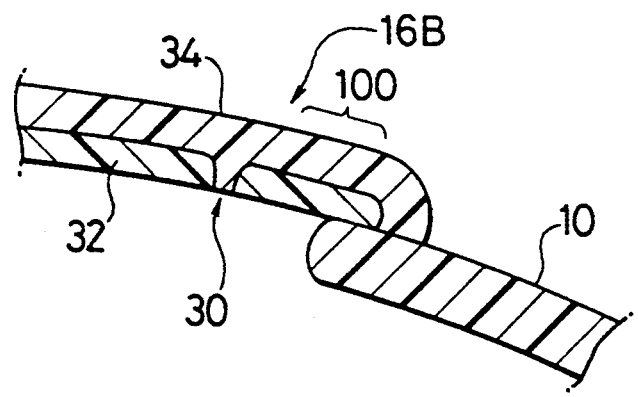
FIG. 4 is a cross section of a lid of another embodiment of the invention.

Although the foregoing embodiment is provided with the bendable portion 30 formed of the groove, the inner layer 32 may be recessed along the bendable portion 30, as shown in FIG. 4, and the recessed portion may be filled with the soft synthetic resin forming the outer layer 34. In the case where a lid 16B has the bendable portion 30 shown in FIG. 4, a portion 100 located between the tip end and the bendable portion 30 may deform when the portion 100 is pushed. In this case, therefore, it is preferable to dispose the instrument panel 10 under the end portion 100, as shown in FIG. 4. In this structure, the end portion 100 does not deform downward even when an upper surface thereof is pushed downward.

Figure 5:
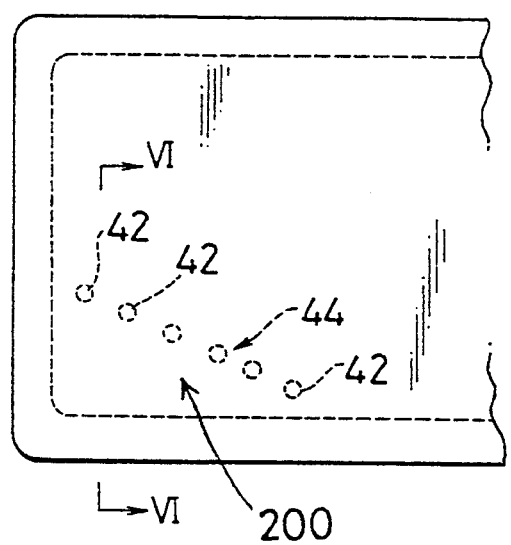
FIG. 5 is a plan of a lid of still another embodiment of the invention.
Figure 6:
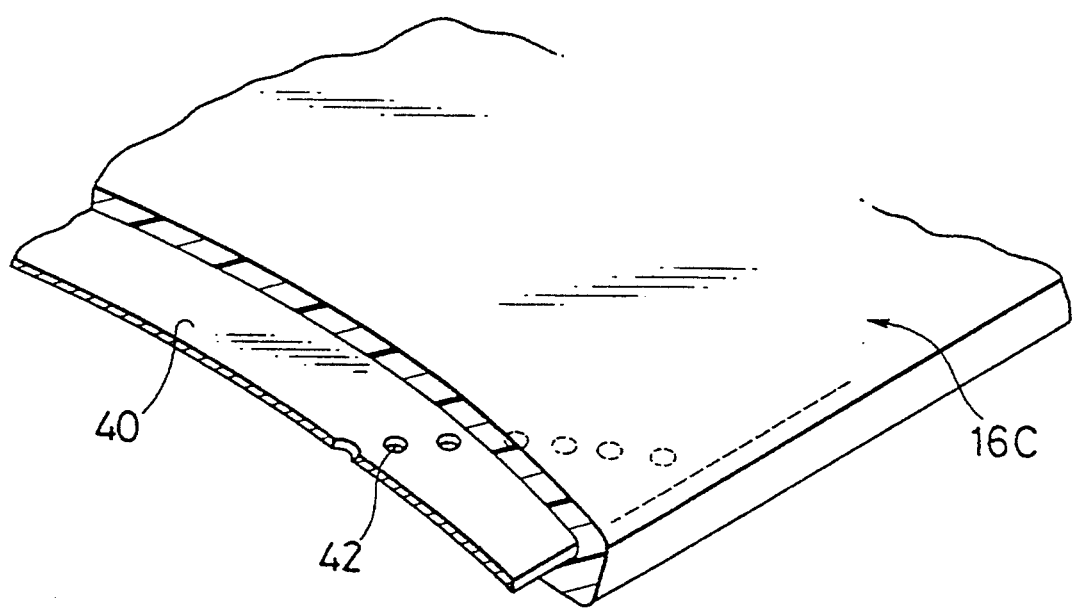
FIG. 6 is a perspective view showing a section taken along line VI—VI in FIG. 5.

FIGS. 5 and 6 are a plan and a cross section showing a lid of another embodiment of the invention, respectively. A lid 16C of this embodiment includes a reinforcement plate 40, e.g., of aluminium which is embedded therein. In this embodiment, the reinforcement plate 40 is provided with a plurality of apertures 42 arranged in a row for forming a bendable portion 44. In the operation of the air bag device having this lid 16C, when an end portion 200 located between the apertures 42 in row and the tip end contacts the windshield, the end portion 200 of the lid 16C bends rearward in view of the rotating direction, which is similar to the operation in FIG. 16C.

The aperture 42 may be of a circular shape, and also may be of an elliptical, rhombic, lens-like or hexagonal shape. In the case of the elliptical, rhombic or lens-like shape, it is desirable to dispose the apertures so that the major axes thereof extend along the direction of the row of apertures.

Figure 7:
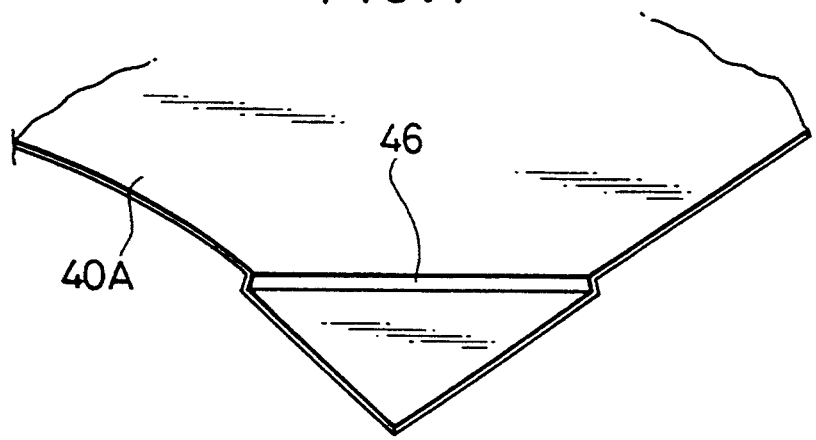
FIG. 7 is a perspective view of a reinforcement plate of a lid used in further another embodiment of the invention.
Figure 9:
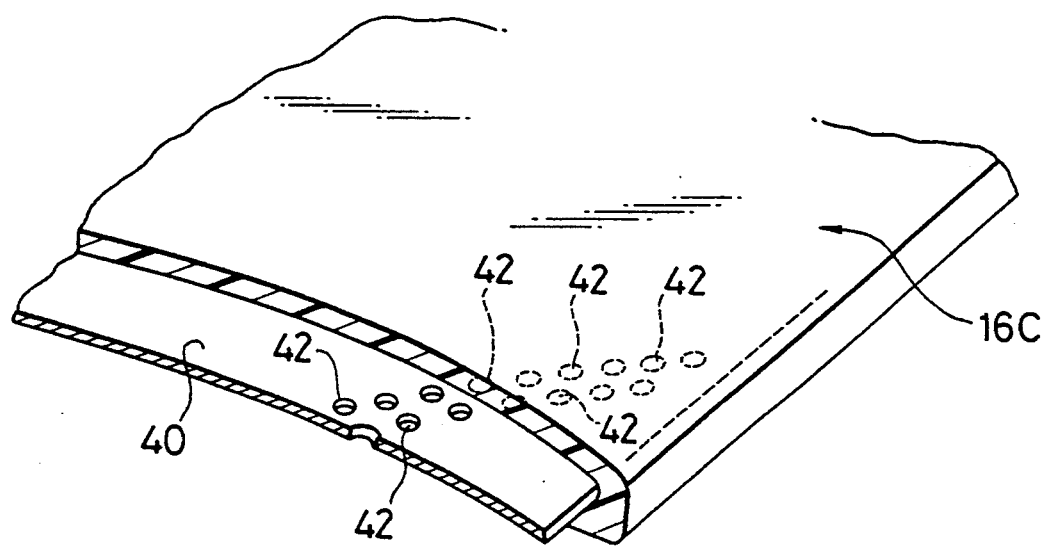
FIG. 9 is a perspective view showing a section of a lid of another embodiment of the invention.
Figure 10:
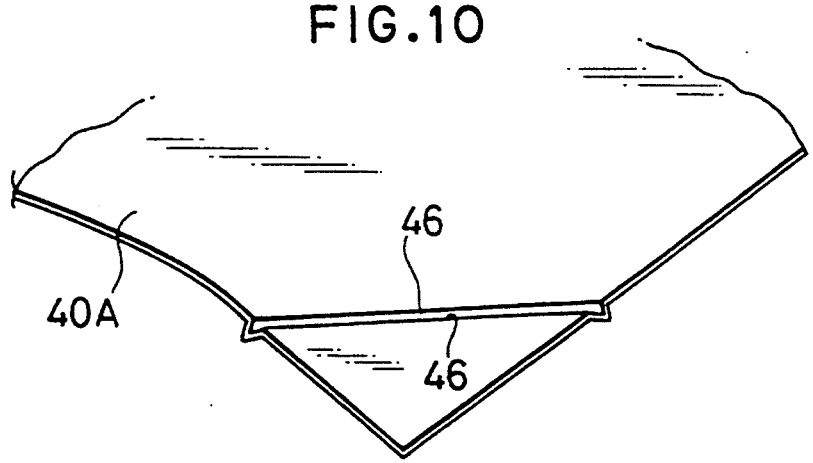
FIG. 10 is a perspective view of a reinforcement plate of a lid of another embodiment of the invention.

Although the bendable portion 44 is formed of the row of apertures 42 in the embodiment in FIG. 6, the invention may have a structure shown in FIG. 7. In the figure, a reinforcement plate 40A is provided with a stepped portion 46. When an end portion located between the stepped portion 46 and the tip end contacts the windshield 28, a bending stress concentrates in the stepped portion 46, so that the lid bent at the stepped portion 46. The apertures 42 or stepped portions 46 may be arranged in multiple rows, as shown in FIGS. 9 and 10, in which case a higher effect can be achieved. The stepped portions may have a V-shaped section, as shown in FIG. 10, or may have a U-shaped section.

According to the lid of the air bag device for the passenger, as described hereinabove, when the lid is rotated in the opening direction in accordance with the activation of the air bag device and contacts the windshield, the tip end portion of the lid contacting the windshield bends rearward in view of the rotating direction. Therefore, the lid continues to rotate and thus opens to a large extent. Accordingly, the air bag quickly develops into the cabin of the vehicle.

What is claimed is:

1. A lid of an air bag device for a passenger, said air bag device having a container with a front opening and being disposed in an instrument panel near a windshield of an automobile, comprising, a rectangular plate for covering the front opening of the container and being formed of synthetic resin and a reinforcement plate embedded in the synthetic resin, attaching means for rotatably attaching the plate to the container at a side of the windshield, and a bendable portion formed in the reinforcement plate and extending linearly to form a triangular portion at a corner of the rectangular plate located away form the windshield and a driver when the lid is installed on the instrument panel, said bendable portion being formed of a stepped portion so that when the triangular portion of the rectangular plate contacts the windshield upon rotation of the plate in accordance with activation of the air bag device, the triangular portion of the plate bends along the bendable portion to widely open the plate.

2. A lid according to claim 1, wherein said bendable portion is formed of stepped portions in a form of a V-shaped section so that the reinforcement plate is located substantially in a horizontal plane except for the stepped portion.

3. A lid according to claim 1, wherein said reinforcement plate is provided with a plurality of stepped portions.

* * * * *